No. 735,406. PATENTED AUG. 4, 1903.
C. M. PALMER.
SYSTEM OF ELECTRICAL DISTRIBUTION AND TRANSFORMING.
APPLICATION FILED DEC. 13, 1899.
NO MODEL.
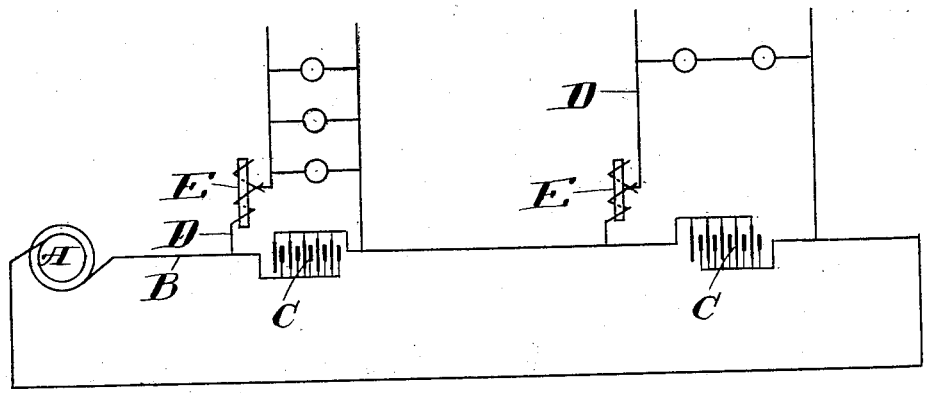
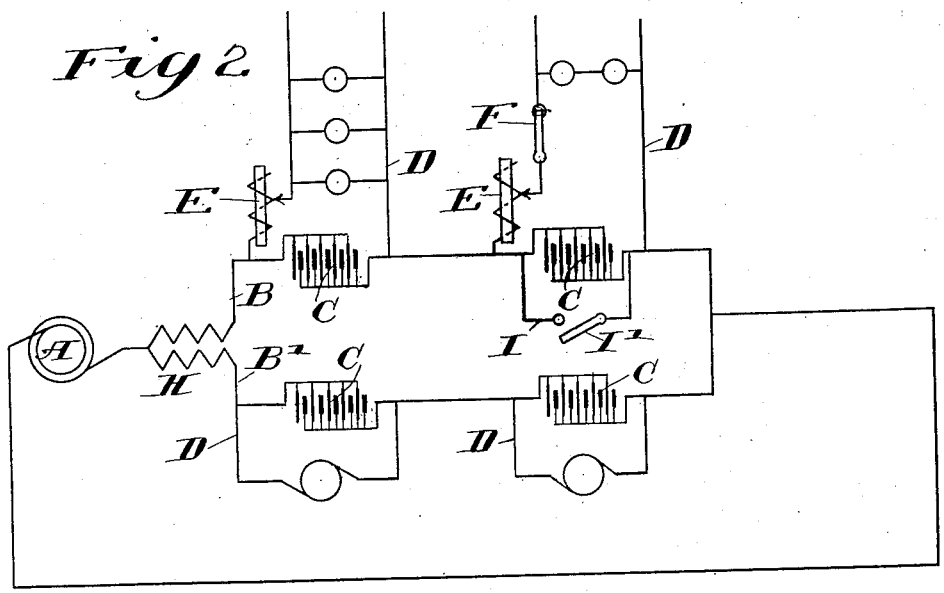
Witnesses:
Inventor:
Chester M. Palmer
by Poo & Brown
his Attorneys No. 735,406. Patented August 4, 1903.

UNITED STATES PATENT OFFICE.

CHESTER M. PALMER, OF FOND DU LAC, WISCONSIN.

SYSTEM OF ELECTRICAL DISTRIBUTION AND TRANSFORMING.

SPECIFICATION forming part of Letters Patent No. 735,406, dated August 4, 1903.

Application filed December 13, 1899. Serial No. 740,184. (No model.)

*To all whom it may concern:*

Be it known that I, CHESTER M. PALMER, a citizen of the United States, and a resident of the city of Fond du Lac, county of Fond du Lac, and State of Wisconsin, have invented new and useful Improvements in Electrical Distribution and Translating, of which the following is a specification, reference being had to the accompanying drawings.

This invention relates to improvements in the distribution and translation of electric current, and the invention relates, first, to means for changing or transforming a direct intermittent or pulsatory current of high potential to a continuous current of low potential and utilizing said low-potential continuous current in a translating-circuit which is connected in shunt with the pulsatory circuit, and, secondly, to means in a system of distribution employing rapidly rising and falling currents, such as pulsatory or alternating currents, for equalizing the current in two parallel circuits or the two parts or members of a branch circuit wherein the resistance in said circuits or branches is variable or wherein the electromotive force thereof is variable.

As shown in the drawings, Figure 1 is a diagrammatic view of a source of intermittent or pulsatory electrical current, a translating device connected in shunt with one side of said current, and means for rectifying or changing the pulsatory current into continuous current for use in said translating-circuit. Fig. 2 is a diagrammatic view illustrating a source of current, a divided circuit, the branches of which are provided with translating devices connected in the manner shown in Fig 1 and also with means for rectifying the intermittent or pulsatory current, and said branches being provided with my improved connection for equalizing the current between the same.

First referring to the construction shown in Fig. 1, A represents a source of intermittent or pulsatory electric current, and B an external closed circuit connected with said source. C C designate storage batteries included in series in said circuit, and D D translating-circuits connected in shunt with the circuit B and supplying current, as herein shown, to electric lamps arranged in multiple arcs in said circuits D. E designates an inductive resistance-coil located in each of the translating-circuits D. Said inductive coils may or may not be of variable resistance and are located in said translating-circuits for the purpose of shielding said circuits from the intermittent or pulsatory current of the circuit B. Said pulsatory current of the circuit B therefore passes into the storage batteries C and is therein changed or transformed and supplied as continuous low-potential currents to the translating-circuits D. In this manner, therefore, the intermittent or pulsatory current of the circuit B is employed to supply the translating-circuits with low-potential continuous currents, and at the same time said translating-circuits are shielded from the effect or influence of the intermittent or pulsatory circuit.

Referring now to my improvements as shown in Fig. 2, A represents a source of rapidly rising and falling current. B B' designate branches of an external circuit which are connected with the opposite poles of the source supplying the current. In each side or member of said branch circuit is included in series storage batteries C C and electric translating-circuits D D, connected in shunt with said members of the branches, those on one side including multiple-arc electric lamps, while those on the other side include continuous-current electric motors. One or both of the translating-circuits D may be provided with switches F, as shown in the lamp-circuit remote from the source of supply A, and a shunt-circuit I and switch I' are shown in one of the branches of the circuit around one of the storage batteries C, whereby said storage battery may be cut out of the circuit. H designates diagrammatically an induction connection between the branches B B' of the external circuit. Said inductive connection consists of two coils of insulated wire wound upon a common core, and therefore insulated from each other, and the core and said coils are connected at one end with the main circuit-wire leading from the adjacent pole of the source of current, and the other ends of the coils are connected, respectively, with the branch wires B B' of the branch circuit. The turns of said coils are equal and are connected with the circuit so as to be of opposite inductive effect, and said coils therefore form when the resistances in both branches are equal a non-inductive connection. When, however, the resistance in one of the branches is decreased by reason, for instance, of cutting out one of the storage batteries C, as by closing the switch I', the effect of said inductive connection is to equalize the current-carrying capacity of both of said branches, so that the same current will flow through both branches. This result is understood to be effected in the following manner: If, for instance, it be assumed that the storage battery C associated with the shunt-circuit I be cut out of the associated branch circuit, the coil connected with the branch B will become a primary coil and the other coil a secondary coil, said primary coil inducing a current through the secondary coil and the branch B' and raising the electromotive force of said branch B' and at the same time by self-induction acting to throw a resistance into the coil connected with the branch B and in said branch, the result being that notwithstanding the cutting out of a part of the resistance of the branch B the division of the current between said branches will be approximately equal. Upon the other hand if an additional resistance be thrown into one of the branches—as, for instance, if after the procedure just described the storage battery C which has been cut out of the circuit be again restored—the non-inductive connection will be reëstablished between the two branches, whereby the division of circuit between said branches is equalized. In other words, the relation of the coils of the connection H is such that when the resistances of the circuits are equal the inductive action of said coils are equal and in opposite directions and neutralize each other, thereby producing a non-inductive connection.

While the connection herein shown is included in a branch circuit, it will be understood that the same or approximately the same results will be secured by introducing said connection between parallel circuits derived from a source or sources of rapidly rising and falling current and wherein it is desired to maintain the eloctromotive force of said circuits substantially equalized either where the source or sources supplying the current is variable or where the resistance in the circuit or circuits is variable. For instance, said connection may be for this purpose introduced between two parallel circuits carrying rapidly rising and falling currents, as alternating or pulsatory currents.

I claim as my invention—

1. A system of electrical distribution embracing a main circuit having a source of intermittent or pulsatory current, a storage battery in said circuit, and an inductive-resistance-translating circuit in shunt with said main circuit and receiving current from the battery.

2. A system of electrical distribution embracing a main circuit having a source of intermittent or pulsatory current, storage batteries connected in series in said circuit, and inductive-resistance-translating circuits in shunt with said main circuit and receiving direct currents from said storage batteries.

3. A system of electrical distribution embracing a main circuit having a source of intermittent or pulsatory current, storage batteries connected in series in said circuit, inductive-resistance-translating circuits in shunt with said main circuit and receiving direct currents from said storage batteries, and a shunt-switch circuit connected with the main circuit around one of said storage batteries, whereby said storage battery may be cut out of said circuit.

4. In a system of electrical distribution, the combination with parallel circuits or branches of a single circuit derived from a source supplying rapidly rising and falling electric current or currents, and translating devices in said circuit or circuits, of an inductive connection between said parallel circuits or branches, said connection being non-inductive when the resistances in said branches or circuits are equal, but acting to equalize the distribution of current to said branches or circuits when said resistance is unequal.

5. In a system of electrical distribution, the combination with parallel circuits or branches of a single circuit derived from a source supplying rapidly rising and falling current or currents, and translating devices in said circuit or circuits, of a connection between said parallel circuits or branches, said connection being normally non-inductive, but acting to equalize the distribution of current to said branches or circuits when the resistance or source supplying the current varies.

CHESTER M. PALMER.

In presence of—
JAMES W. WATSON,
GEO. M. BRUGGER.